July 17, 1928.

J. P. FERRARI

POWER DRIVEN FRUIT PRESS

Filed Aug. 3, 1925      2 Sheets-Sheet 1

1,677,517

INVENTOR
JOHN P. FERRARI
BY ATT'Y
Lincoln Holmes

July 17, 1928.  
J. P. FERRARI  
POWER DRIVEN FRUIT PRESS  
Filed Aug. 3, 1925  
1,677,517  
2 Sheets-Sheet 2
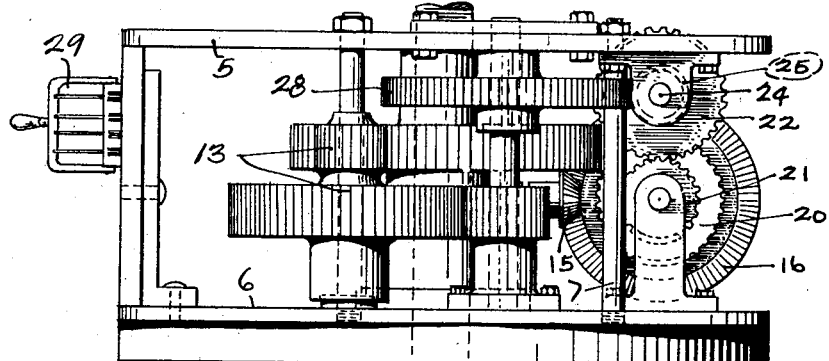
Fig. 3.
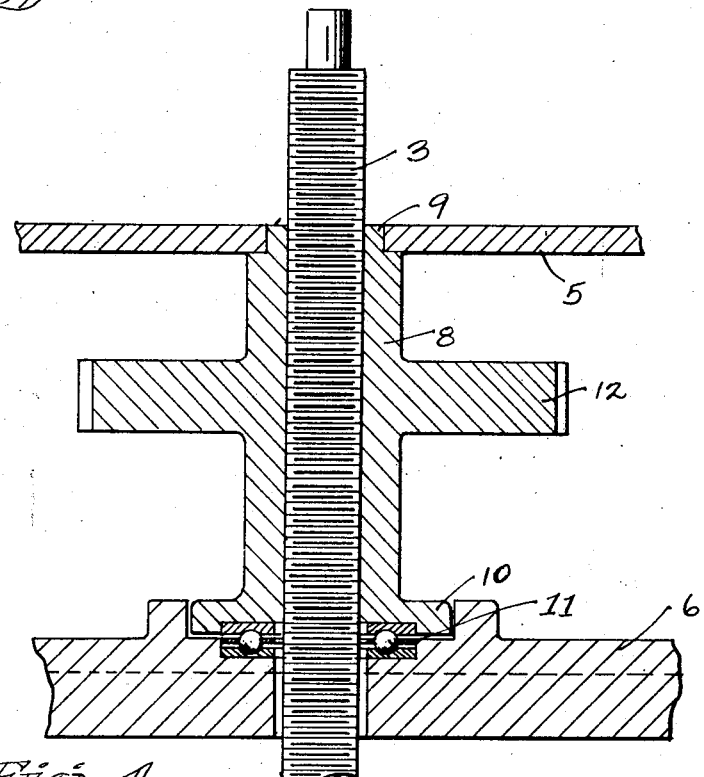
Fig. 4.
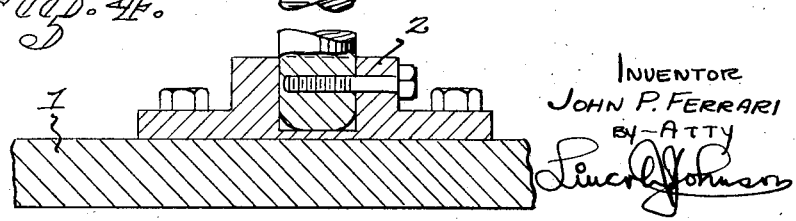
INVENTOR  
JOHN P. FERRARI  
BY–ATTY Patented July 17, 1928.

1,677,517

UNITED STATES PATENT OFFICE.

JOHN P. FERRARI, OF SAN FRANCISCO, CALIFORNIA.

POWER-DRIVEN FRUIT PRESS.

Application filed August 3, 1925. Serial No. 47,749.

This invention relates particularly to a power driven apparatus adapted to be operatively mounted on a press to be used for the purpose of squeezing juices from fruits.

An object of the invention is to provide a power driven apparatus that can be mounted on the threaded shaft of a conventional form of fruit press to take the place of and do the work of the hand operated appliances now used for pressing fruits.

A further object of the invention is to provide a self-contained pressing unit having an electric motor connected with a suitable gear train operatively mounted on the threaded shaft of a conventional type of fruit press and by means of the motor and gearing the pressing unit is moved into contact with the fruit during the pressing operation and withdrawn from the pressed fruit after the completion of the pressing operation.

Other objects of the invention are to provide a power driven fruit pressing mechanism which consists of a motor and a suitable selective speed gear transmission, comprising an apparatus that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings:

Fig. 3 is an end elevation of Fig. 2 taken on the line 3—3.

Fig. 4 is an enlarged fragmentary section taken through Fig. 2 on the line 4—4.

Figure 1:
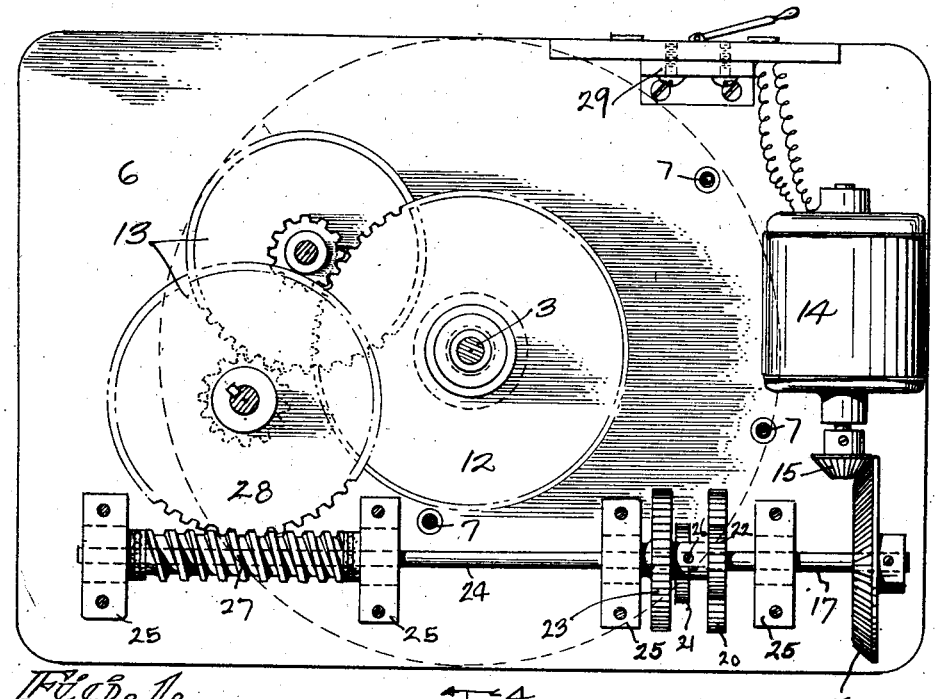
Fig. 1 represents a plan section taken through a power driven fruit pressing apparatus constructed in accordance with my invention, taken on the line 1—1 of Fig. 2.
Figure 2:
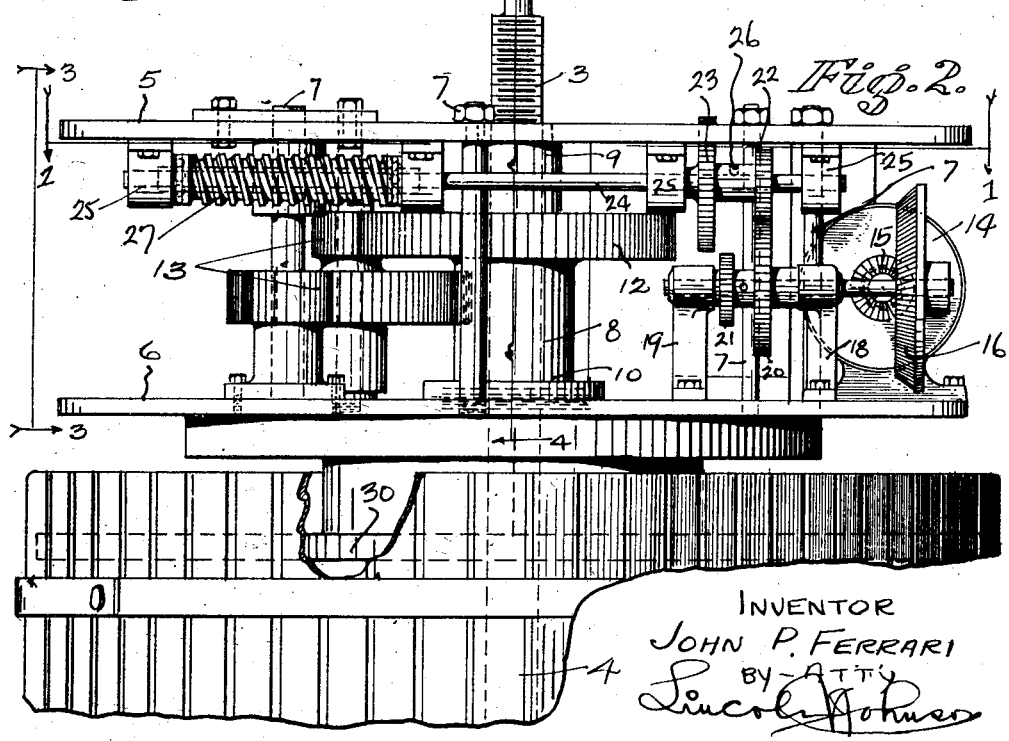
Fig. 2 is a side elevation of Fig. 1 showing the apparatus applied in operative position to the threaded shaft of a fruit press.

The conventional type of fruit press used for the purpose of pressing the juices from fruits such as apples, grapes and the like, consists of a base on which a slatted drum structure is positioned. The base of the press is provided with a threaded shaft fixedly arranged centrally thereon and a pressing collar is mounted on the upper end of the threaded shaft to be moved up or down on the said shaft manually, by means of suitable levers. In the reverse case the threaded shaft is revoluble in the base, and the said shaft is rotated manually. In either construction, turning movement of the collar on the shaft, or turning movement of the shaft itself, causes a pressure plate to be brought into contact with the fruit and the said fruit thereby pressed to a degree where the greater part of the natural juices are to be squeezed therefrom. The operation of pressing the fruit by hand power is not only laborious but slow. My invention contemplates the substitution of a power driven apparatus in lieu of the hand power apparatus, to accomplish the pressing of the fruit in a rapid and effective manner.

In detail, the construction illustrated in the drawings comprises a fruit press base 1 (Fig. 4) having a flange 2 arranged centrally thereon, in which a threaded shaft 3 is fixedly positioned. A drum 4, is formed of a plurality of separated slats or staves which are located on their ends around the threaded shaft 3. The fruit to be pressed is placed within the drum 4 on the upper face of the base 1 and around the threaded shaft 3. The power driven apparatus, which is mounted on the threaded shaft for pressing the fruit, consists of a pair of plates 5 and 6 held together in spaced parallel relation by the spacing shafts 7. An internally threaded collar 8 is revolubly journaled at its opposite ends 9 and 10 in the respective plates 5 and 6 of the frame, and between the lower end of the collar 10 and the plate 6 a suitable thrust bearing 11 is interposed. The collar 8 is threadedly engaged with the shaft 3 and supports the plates 5 and 6 on the shaft 3. A gear 12 is mounted on the collar 8 and said gear 12 is enmeshed with a reducing speed gear train generally designated by the numeral 13.

A motor 14 is positioned on the plate 6 and said motor is provided with a bevelled gear 15 on the armature shaft thereof. The bevelled gear 15 meshes with a bevelled gear 16 which is fixed on a shaft 17 rotatively journaled in bearings 18 and 19 secured on the plate 6. A pair of connected gears 20 and 21 are fixed on the shaft 17 so as to turn therewith. The gears 20 and 21 are adapted to be meshed interchangeably with the respective change-speed gears 22 and 23 movably held on the worm shaft 24, which is revolubly mounted in bearings 25 secured to the under face of the plate 5. A set screw 26 is arranged in the drum connecting the change-speed gears 22 and 23 for locating said gears on the shaft 25 and bringing the same into engagement with either of the respective gears 20 and 21.

A worm 27 is fixed on the end of the worm shaft 24 and meshes with a worm gear 28 in the gear train 13. An electric switch 29 is provided on the plate 6 to control the flow of electrical energy into the motor 14 and to regulate the movement thereof. The switch 29 is a "two-way" switch so that the direction of movement of the motor armature may be controlled for the purpose of moving the gear train 13 in a clockwise or counter-clockwise direction.

A fruit press constructed in accordance with my invention would be operated in the following manner: The collar 8 and the frames 5 and 6 with the other mechanism thereon would be positioned on the threaded shaft 3. The motor 14 would be energized and the rotative movement thereof transmitted through the change speed gearing 13 to the collar 8 which would advance relative to the fixed shaft 3 and the relatively immovable frame members 5 and 6. Rotative movement of the collar 8 advances the lower frame 6 into contact with a pressure plate 30, placed on top of the fruit to be pressed. The friction created between the plate 6 and pressure plate 30 is sufficient to prevent the frame mechanism from turning relative thereto, and constant rotation of the collar 8 causes the mechanism to be advanced downwardly on the fruit to press or squeeze the juices therefrom. The motor driven gearing thus effectively performs the same squeezing operation on the fruit that has heretofore been accomplished through manual effort. By the use of my mechanism, one man may handle the entire pressing operation, whereas, by the use of the conventional hand power mechanism, the services of two or three individuals are required. After the fruit has been squeezed so that substantially no more juice remains therein, the motor 14 is reversed and the squeezing frames 5 and 6 withdrawn from contact with the fruit, permitting the squeezed mass to be withdrawn from the drum 4 and the same charged with a fresh supply of fruit.

Having thus described this invention, what I now claim and desire to secure by Letters Patent is:

1. A device of the character described comprising a drum; a threaded shaft extending upwardly from said drum; a collar threaded on said shaft; a base plate secured to said collar; a reducing speed gear train, a gear mounted on the collar, said gear meshing with said reducing speed gear train mounted on said base plate; a worm shaft, a shaft journaled on said base plate; connected driving gears fixed on the shaft, change of speed gears movably mounted on said worm shaft, a worm on the end of the worm shaft; a worm gear in the gear train, said worm meshing with said worm gear, and a reversible motor for driving said first mentioned shaft to cause said collar and base plate to descend upon said threaded shaft.

2. A device of the character described comprising a central threaded shaft; a spool shaped frame having a threaded collar mounted on said shaft, said threaded collar having threaded engagement with said shaft, said frame having a base plate; a shaft journaled on said base plate; a pair of connected gears on said shaft; a worm shaft, mounted on said base plate having a worm on one end; a drive connected change of speed gears on said worm shaft adapted to selectively mesh with said first mentioned gears; a set screw for fixing said last mentioned gears; a train of reduction gears mounted on said base plate with which said worm has engagement and a gear on said collar meshing with said reduction gears; and means for causing said first mentioned shaft on said base plate to rotate said frame on said first mentioned central shaft.

In testimony whereof, I have hereunto set my hand at San Francisco, California, this 17th day of July, 1925.

JOHN P. FERRARI.